United States Patent [19]

Carson

[11] 3,789,989
[45] Feb. 5, 1974

[54] FLOW DISTRIBUTION APPARATUS
[75] Inventor: Don B. Carson, Mount Prospect, Ill.
[73] Assignee: Universal Oil Products Company, Des Plaines, Ill.
[22] Filed: July 24, 1972
[21] Appl. No.: 274,146

[52] U.S. Cl. ............... 210/284, 23/285 R, 210/291
[51] Int. Cl. .............................................. B01d 23/10
[58] Field of Search .. 23/284, 285, 288 R; 210/263, 210/264, 266, 284, 285, 290; 261/97

[56] References Cited
UNITED STATES PATENTS
| | | | |
|---|---|---|---|
| 3,214,247 | 10/1965 | Broughton | 210/264 X |
| 3,407,045 | 10/1968 | Temple | 23/284 X |
| 560,777 | 5/1896 | Church | 210/264 X |
| 1,189,114 | 6/1916 | Irwin | 210/284 X |

Primary Examiner—Samih N. Zaharna
Assistant Examiner—Robert H. Spitzer
Attorney, Agent, or Firm—James R. Hoatson, Jr. et al.

[57] ABSTRACT

A baffling and flow distribution apparatus for use in a system in which a fluid is desired to be passed from one bed of particles to another bed of particles with addition or withdrawal of fluids between the beds at a location within a baffling and flow distribution apparatus which itself is located between the beds. The invention includes two substantially parallel solids retaining screens which are spaced apart and which contain ribs between said screens which radiate from a central support hub. The screens also have placed between them a fluid deflection plate which has a passage in it and which has placed near the passage a fluid transfer means which can allow fluid when passing from one bed through the screens, through the passage through the other screen and into another bed, to pass by said transfer means so fluid may be added or removed from the apparatus. The above apparatus allows placement of the fluid transfer means within the apparatus at a position which can improve the flow characteristics of fluid materials passing from one bed through the opening into another bed.

5 Claims, 3 Drawing Figures

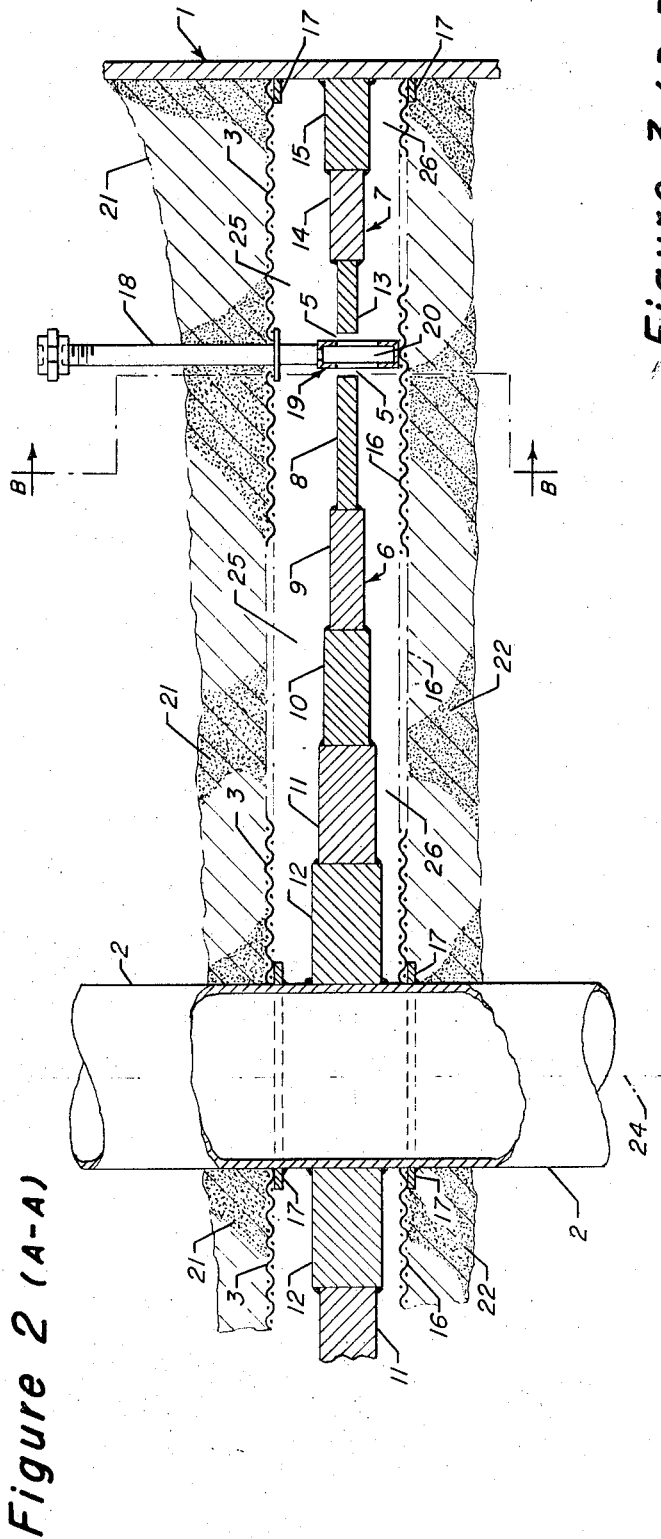
Figure 2 (A-A)
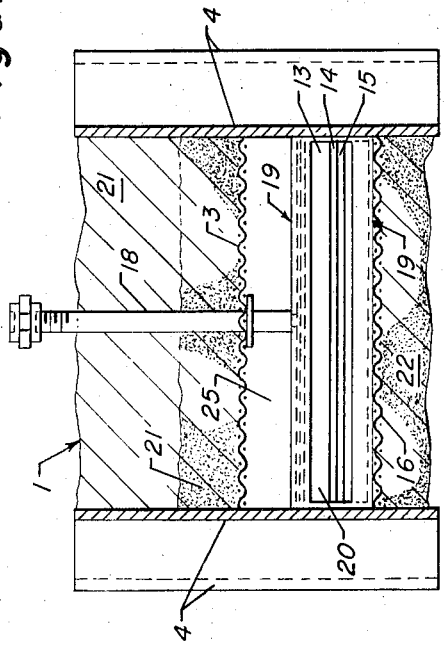
Figure 3 (B-B)

FLOW DISTRIBUTION APPARATUS

BACKGROUND OF THE INVENTION

1. Field of the Invention

The field of art to which this invention pertains is fluid distribution apparatus. More particularly, this invention relates to an apparatus or system which is utilized in a bed of solid adsorbent particles to cause the flow of fluids through said beds in a plug flow manner when fluid is removed or added to the apparatus while passing through the apparatus of this invention.

2. Description of the Prior Art

It is well known in the art that various devices can be utilized to effect a perfect mixing of fluids when passing between contacting stages in a staged operation. Typically staged contacting occurs in such diverse operational units as fractionators, extractors, solid-liquid or solid-gas contactors. Distribution is utilized to reach equilibrium mixture in passing from one stage to another. It is known that the use of distribution devices between stages greatly increases the efficiency of operation in that it prevents localized high concentration gradients of various materials which if not mixed and diluted could place undue strain upon various contacting stages and effect poor separation or contacting operations.

My invention relates to an improved apparatus for contacting materials. Particularly my invention relates to a specific application of a flow distribution apparatus. My invention is especially adapted for use in what can be referred to in the art as a simulated countercurrent moving bed fluid-solid contacting operation. These operations are generally described in U. S. Pat. No. 2,985,589 having as its inventor Donald B. Broughton and issued to UOP to which the fluid distribution device of my invention is particularly applicable.

In certain operations in which a fluid is desired to contact a solid to effect the selective removal of particular feed component from the fluid with the subsequent contacting of the solid with the desorbent material, staged operations can take place in which adsorption and desorption operations occur at different portions of the adsorbent bed. In order to perform these operations, it is necessary that feed stock and desorbent inlets and extract and raffinate stream outlets from the adsorbent column be shifted throughout the column of adsorbent to effect adsorption and desorption operations respectively in various portions of the bed. It can be seen from reading the above cited patent that these operations can be performed in a continuous manner if the fluid material which has a varying composition throughout the bed is shifted in a given direction along with the input and output streams in a coordinated manner to allow an essentially continuous production of raffinate and extract materials with the continuous use of feed and desorbent materials.

One of the problems associated with the above type of an operation is being able to withdraw or inject fluids within the process without upsetting the overall fluid flow when going from one adsorbent bed to another through a distribution apparatus. In order to allow such processes to function efficiently, it is desired that sharp breakthrough fronts be present in the fluid to separate it into distinctly defined compositions depending on whether the fluid is present in an adsorption or desorption zone in the column of adsorbent or being transferred from one operation to another. It is also desired to thoroughly mix any fluid which is introduced into the process through the apparatus to eliminate any pockets of high concentrations of fluid components, to remove a given fluid composition from the process through the apparatus thoroughly eliminating the possibility of contamination of fluid with unremoved material when the fluid is shifted into this section of the process, and to maintain plug flow of fluid throughout the adsorbent columns.

In order to allow substantially plug flow through the adsorbent beds and the efficient removal of material while maintaining the plug flow, it is desired that a fluid entrance or withdrawal stream be placed somewhere in the middle of the cross-sectional area of the dense bed of adsorbent particles. Ideally, one would like the fluid exiting from all parts of the adsorbent bed at any particular time to arrive at the fluid entrance/withdrawal point simultaneously. Similarly, one would like the fluid leaving the entrance/withdrawal point to arrive at all parts of the entrance of the subsequent adsorbent bed simultaneously. The invention which follows approaches this ideal situation.

My invention essentially utilizes two solids retaining screens which are parallel and spaced apart to be located between adsorbent particle beds. Between the screens there is a plurality of ribs and a baffle plate which has a passage way located in it to allow fluids to flow from a dense bed through one screen, against the deflection plate, through the passage way, through the other screen and into the other dense bed. By preferably utilizing a fluid deflection plate which is tapered to have a reduced thickness as it approaches the passage in the deflection plate, it is possible to cause the fluid velocity of the fluid leaving the dense bed and passing through screens at the more remote locations from the passage way to be increased from that which it would be if the fluid deflection plate were not tapered. By increasing the velocity of the more remotely located fluid, it is possible to clear out fluid from the more remote void areas and to more efficiently remove fluid in an overall plug flow manner than when other type flow distribution devices are utilized.

The present preferred apparatus can be used in instances where low and equal fluid velocities through an annular bed of solids is desired, where extremely low fluid velocities at the inner and outer boundaries cannot be tolerated and where all the fluid from a bed of particles is desired to be gathered together and mixed with external fluid introduced into the system or mixed and withdrawn from the system as the case may be.

SUMMARY OF THE INVENTION

My invention can be briefly summarized as a baffling and flow distribution apparatus which comprises the two substantially parallel solids retaining screens which contain a deflection plate located between the screens and ribs connected to the screens and to the deflection plate to separate the volume between the ribs into various compartments. The deflection plate provides a passage-way and a fluid transfer means adjacent to it to allow fluid which is passing through the screens, through the passage-way, through the other screen and into the other dense bed to be removed from the apparatus or to have external fluid added to the fluid passing through the passage.

A broad embodiment of my invention resides in a baffling and flow distribution apparatus located between two beds of solid particles having a common axis and an outer edge radially located from said axis comprising: two substantially parallel solid retaining screens spaced apart and connected to ribs located between said screens and attached to a central support hub and radiating from said support hub, said hub axially aligned with said axis of said beds, with said ribs extending to outer edges of said beds to form a plurality of segment volumes between said screens and ribs, each segment volume containing a fluid deflection plate located between said screens, connected to and projecting from said support hub to the outer edge of said beds, said plate connected to said ribs to separate said segment volume into two compartments; said deflection plate having a passage connecting said compartments within said segment volume and located between said support hub in the outer edge of said beds along said plate; and a fluid transfer means located adjacent to said passage and connected to a fluid transfer conduit to effect the passage of fluid between said conduit and said passage within said segment volume.

BRIEF DESCRIPTION OF THE DRAWINGS

The attached figures show a preferred embodiment of the apparatus of my invention.

FIG. 2 is an illustration of section A indicated in FIG. 1 while

FIG. 3 is section B as illustrated in FIG. 2.

In FIG. 1 the column walls or the outer edge of the column, generally indicated at 1, are shown in sectional view. Located in the center of column 1 is support hub 2. Support hub 2 is typically a pipe which is aligned axially with axis 24. Axis 24 represents the axis of the dense beds of particles confined within column 1 itself, and support hub 2. Solids retaining screens 3 and 16 are shown placed so that they traverse the entire cross-sectional area within column 1 and are slightly spaced apart. In FIG. 1 when looking down upon the apparatus screen 3 is the upper screen while screen 16 is the lower screen. Ribs 4 are shown located between screens 3 and 16 and attached to support hub 2 and radiating axially from the support hub and contacting the outer edges of the beds (column 1) forming a plurality of segment volume between the screens. The segment volumes are generally defined as the volume contained between ribs 4 extending from central hub 2 to the outer edge of the bed or column 1 between screens 3 and 16. Located within each segment volume is a fluid deflection plate 6 and 7 which is located between screens 3 and 16 and connected to support hub 2. The fluid deflection plate projects from the support hub 2 between the screens to the inner surface of column 1. Plates 6 and 7 are connected to the ribs thereby essentially separating the above mentioned segment volume into two compartments. The two compartments are typically defined as the volume above the deflection plate between the ribs extending up to screen 3 and the volume below the deflection plate 6 and extending between ribs down to solids retaining screen 16.

The fluid deflection plate as shown comprises plates 6 and 7 projects from the central hub to the inner walls of the column and can be essentially separated into two distinct segments. The inner portion (plate 6) is that portion radiating from the central hub and extending to the outer most edge of plate 6 (shown as section 8 of plate 6) and that portion beginning with section 13 and extending to the outer most section 15 which is connected to the wall of the column is the outer portion. The deflection plate typically contains a passage 5 which is defined as an opening in the plate which can allow the upper and lower compartments to be connected. In FIG. 1 the passage 5 traverses the deflection plate between ribs 4 and cuts the deflection plate into two sections. The passage 5 need not traverse the entire deflection plate but in many instances may be a whole or circular volume cut out of the deflection plate to allow fluid to flow from the upper portion of the plate through that passage and to the lower portion of that plate.

Figure 1:
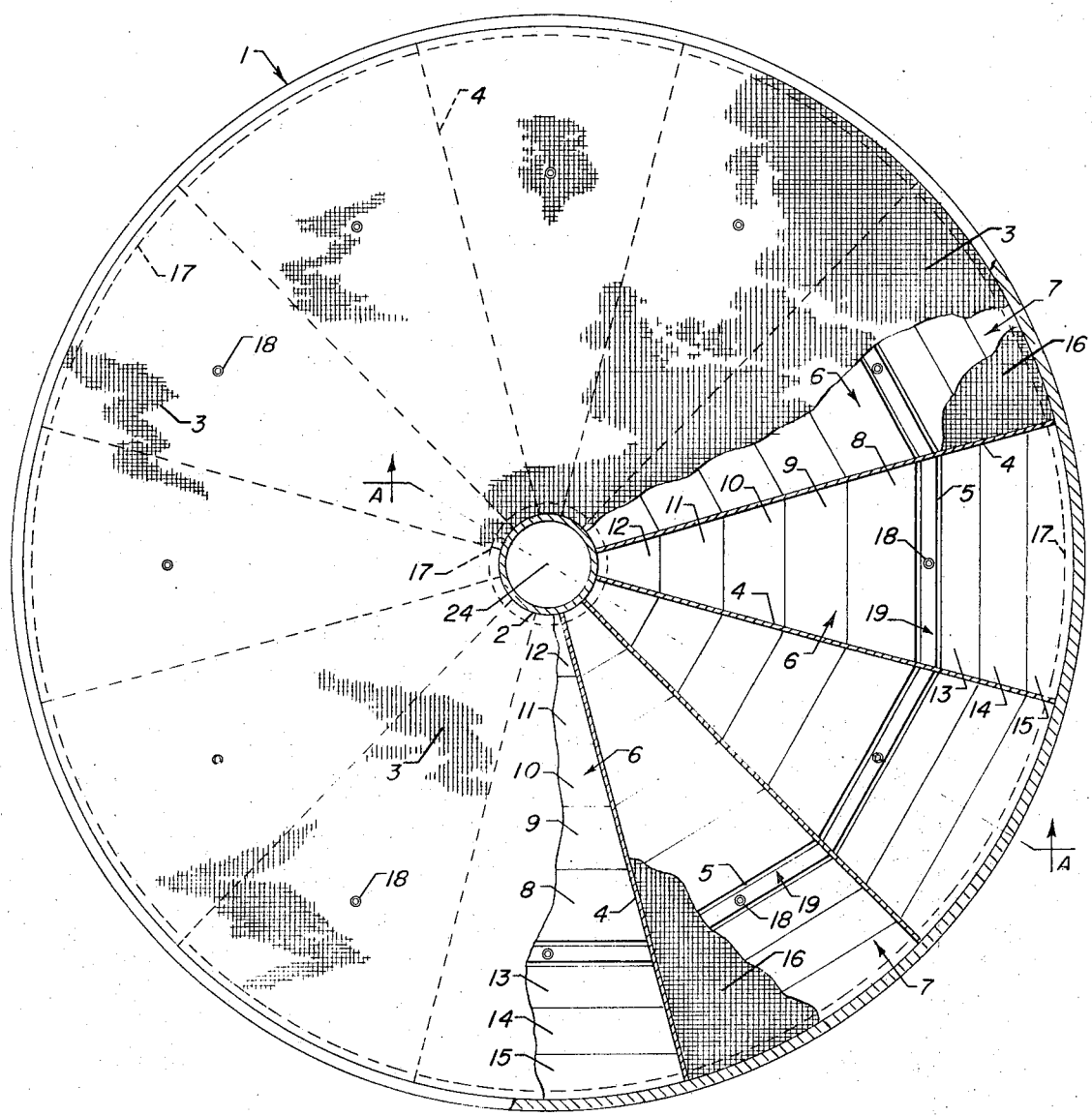
FIG. 1 discloses an overhead horizontal section of my invention.

Located adjacent to the passage 5 is a fluid transfer means 19. Typically the fluid transfer means 19 comprises a conduit or distribution box which can allow fluid passing between through the passage 5 to either be removed from the system via the fluid transfer means or a fluid can be interjected into the passageway from the fluid transfer means 19. Typically the fluid transfer means 19 is connected to a fluid transfer conduit 18 which can be connected to piping which can carry material into or out of the system depending upon whether it is desired to inject or remove fluid from passage-way 5. As can be seen there are 12 fluid transfer conduits 18 located on the fluid deflection plate. Depending upon the amount of ribs utilized to separate the area between and solids retaining screens 3 and 16 there can be any number of segment volumes. Preferably there are six or more. It is preferable to have a plurality of segment volumes in order to allow fluid to be removed from the annular bed of particles located within the confines of column 1 and the outer most wall of support hub 2 so that when removing or adding fluid to all of the fluid transfer conduits 10 located between screens 3 and 16 essentially plug flow of fluid can be maintained within the system.

Plates 6 and 7 in FIG. 1 as shown can be tapered so that its overall thickness, in a direction parallel to axis 24, can be reduced as one proceeds from central hub 2 through sections 12, 11, 10, 9 and 8 of plate 6. Plate 7 can increase in thickness, when measured parallel to axis 24, as one proceeds through sections 13, 14 and 15 projecting away from central hub to and towards the wall of column 1. The preferred reason for utilizing the sections of reduced deflection plate thickness when proceeding from the wall of the column and support conduit 2 to passage 5 will be described in greater detail below.

Section AA of FIG. 1 is shown in FIG. 2. In FIG. 2 only a cross-section of one compartment is shown in order to simplify the illustration. FIG. 2 shows axis 24 being axially aligned with support hub 2 and column 1. Axis 24 is also axially aligned with the annular beds of solid particles 21 and 22 which are located above and below the solids retaining screens 3 and 16 respectively.

Solids retaining screens 3 and 16 as shown in FIG. 2 are substantially parallel and are spaced apart as shown. Solid retaining screens 3 and 16 substantially traverse the inside cross-sectional area between support hub 2 and the wall of the column. They are connected to support hub 2 and said wall by means 17 which may be welds or support bars which can adequately support the screens and allow a relatively fluid tight seal to be created between the respective solids retaining screens and the support hub 2 and said wall.

Support screens 3 and 16 are spaced apart to allow the fluid deflection plate which is represented by plates 6 and 7 to be located between the screens. As shown in FIG. 2 the fluid deflection plate is essentially separated into 2 segments. This is possible because a fluid passage 5 substantially traverses the deflection plate between ribs 4 causing the plate to be essentially separated into two individual plates. In instances in which passage-way 5 would be a smaller opening the plate will be essentially continuous connected solid piece of material. For the purposes of FIG. 2 we shall refer to the fluid deflection plate as comprising inner plate 6 and outer plate 7. Inner fluid deflection plate 6 becomes reduced in thickness as one proceeds through sections 12, 11, 10, 9 and 8 to passage 5. Outer fluid deflection plate 7 increases in thickness as one proceeds from passage 5 to the column wall through sections 13, 14 and 15. In FIG. 2 the inner and outer fluid deflection plates are shown having the overall taper as a specific embodiment, but in many instances the apparatus can be constructed and can perform in an efficient manner utilizing a fluid deflection plate having a tapered thickness.

The inner and outer plates of the fluid deflection plate separate the overall segment volume formed by ribs 4 and solids retaining screens 3 and 16 into two compartments. The upper compartment is defined as the volume 25 while the lower compartment is defined as volume 26. The upper and lower compartments are essentially separated from each other except for passage-way 5 which is cut out of the fluid deflection plate. Since the fluid deflection plate, and in this instance inner deflection plate 6 and outer deflection plate 7, in addition to being connected to the central hub 2 and the outer wall of column 1 are also connected to ribs 4 shown in FIG. 1. This causes the upper compartment volume 25 and the lower compartment volume 26, in FIG. 2, to be substantially segregated except for passage 5. It is preferred to separate the segment volumes into two compartments to cause fluid flow from the upper compartment 25 to the lower compartment 26 to be directed through passage 5 only.

Located within passage 5 is fluid transfer means 19. Fluid transfer means 19 is connected to fluid transfer conduit 18 and passes through solids retaining screen 3. Fluid transfer means 19 connects fluid transfer conduit 18 with the volume within passage 5 via the volume 20 within a fluid transfer means 19. In normal operations the fluid transfer means 19 is able to either remove material passing from upper compartment 25 through passage-way 5 and into the lower compartment 26 or to add material to the fluid passing from the upper compartment 25 to the lower compartment 26 via passageway 5.

FIG. 3 shows the section BB shown from FIG. 2. The view shown in FIG. 3 is looking from within passage-way 5 adjacent to inner fluid deflection plate 6 and in an outward direction. Shown in FIG. 3 are upper solids retaining screen 3 and lower solids retaining screen 16. The upper and lower solids retaining screens are substantially parallel as shown and are spaced apart having ribs 4 located essentially perpendicular to the retaining screens and connected to the retaining screens to form a segment volume defined by the upper and lower solids retaining screens, the ribs 4 and support conduit 2 and wall 1. Placed between the solids retaining screens is fluid transfer means 19 which is connected to fluid transfer conduit 18 which traverses the entire passage and is connected to ribs 4. The open space 20 shown within fluid transfer means 19 is directly connected to fluid transfer conduit 18 and allows the passage of fluid through the fluid transfer means either into passage-way 5 or out of passage-way 5 depending upon whether fluid is desired to be injected or removed from the passage-way. In looking through the open space 20 of fluid transfer means 19 there is seen the three gradually increasing thicknesses (sections 13, 14 and 15) of the outer fluid deflection plate 7 as was illustrated in FIG. 2. The outer fluid transfer plate 7 with these sections essentially separates the segment value into an upper and lower compartment the upper compartment being that volume above the sections and the lower compartment being that volume within the segment below the sections.

The above drawing is a specific illustration of the preferred embodiment of the apparatus of my invention and is not to be utilized to unduly restrict the scope of the claims.

DETAILED DESCRIPTION OF THE INVENTION

The apparatus of my invention is particularly suitable for use in fluid-solid contacting processes in which a fluid material is passed between a plurality of dense beds containing solid particles. Particular examples of such processes include separation processes in which a fluid contacts solid adsorbent particles at conditions to allow one of the components of the fluid to be selectively adsorbed by the adsorbent particles and eventually recovered from the adsorbent in a desorption step. In instances in which the beds of adsorbent material are stationary and input and output streams to the beds are shifted in a programmed and cyclic manner to simulate a moving bed system, it is desired to be able to introduce and withdraw fluid from the stationary dense beds at points located between the plurality of dense beds in a manner which substantially eliminates contamination of the material withdrawn from non-desired components of the fluid left behind in the adsorbent beds. Particularly, it is desired to maintain essentially plug flow in the beds.

Plug flow is generally defined as a condition in which elements of the fluid entering a bed through different portions of the solid adsorbent in the bed ideally receive substantially equal treatment as the fluid passes through the bed. Plug flow is well described in the art and is known to those skilled in separation arts. The reason for attempting to maintain plug flow of fluid through solid adsorbent particles is that sharp and predetermined breakthrough fronts are desired in order to separate the continuous stream of fluid which is moving through the dense bed into specific zones which are defined by specific compositions of the fluid contained in the zones. It is desired to eliminate areas within the solid adsorbent particle bed in which there is a gradual change in fluid composition in passing from one fluid zone to another. The ability to maintain strict plug flow would necessarily allow fluid composition to greatly change when proceeding incrementally through the adsorbent particle bed. This is what the art refers to as sharp breakthrough fronts, namely large, predictable and uniform changes in fluid composition of fluid material when proceeding through a dense bed of adsorbent particles.

In addition it is also desired to eliminate localized high concentration gradient of fluid materials within the dense bed when introducing and withdrawing fluid material from the apparatus locations between the dense beds. It is also desired that the material fluid introduced into the fluid stream passing between dense beds be totally mixed with the fluid passing between the beds in order to prevent high concentration gradients with injected fluid within the system. This mixing is only possible when an apparatus or fluid baffling device is located between the dense beds which can cause total mixing of material between the beds. This mixing which occurs between the beds can distribute fluid which is being injected into the fluid distribution device located between the beds and can allow a fluid which is withdrawn from the fluid distribution device between the dense beds to have an essentially continuous composition.

Another desirable function of a fluid distribution apparatus to be used between dense beds of adsorbent particles, is one that will allow the withdrawal of fluid from a single point within the dense bed while maintaining plug flow in the beds while allowing fluid present at locations quite remote from the withdrawal point to be removed from the adsorbent particles without unduly upsetting the normal plug flow through the adsorbent particle.

All the above desired operations can be performed utilizing the fluid distribution apparatus of my invention. Specifically, the mixing of fluids passing between adsorbent particle beds can take place in the restriction defined in the claims as the fluid distribution plate passage (passage 5). This passage is substantially small enough to cause a pressure drop of fluid passing through its area to cause mixing of the fluid. Also material removed or injected into the fluid passing through the passage 5 is mixed with material passing through the passage because of the fluid transfer means located adjacent to and preferably within the passage within the fluid distribution plate.

The preferred embodiment in desiring that the fluid distribution plate have a reduced thickness in proceeding from the support column to the opening in the inner plate and from the wall to the passage-way in the outer plate also allows the more remotely oriented fluid in the adsorbent particles to be recovered from the particles while also recovering the fluid from areas in the adsorbent bed within a close proximity of the fluid transfer means while maintaining essential plug flow throughout the cross-sectional area of the dense bed.

The largest volume between the two screens available for fluid is located within a close proximity of the passage and fluid transfer means. When removing material from the segment volume between the screens via fluid transfer means 19 the material which would be more easily removed (the fluid located within a close proximity of the fluid transfer means) is the largest volume of material in the compartment so that when the material is removed from the compartment the more remotely located fluid can also be removed since the volume that material occupies between the screens is reduced as compared to the fluid contained nearby the fluid transfer means. The reduced volume located in the compartment at the remote locations from the passage, (caused by the preferred taper of the fluid deflection plate) allows fluid in these locations to have a relatively high velocity which helps remove them from the compartment.

Materials of construction which can be utilized in constructing the apparatus of my invention typically are metals which can withstand the temperatures and pressures of an operating process utilizing the apparatus. Additionally, the construction materials should be able to support relatively large weights of adsorbent particles which are typically stacked upon the solids retaining screens. The column which contains the adsorbent bed particles is an elongated cylinder having diameters anywhere from a few inches up to many feet and a length typically greater than about a few feet and in many instances greater than about 100 feet. The support hub is typically an elongated column or small diameter pipe and is preferably axially aligned with the axis defining the conduit. Typically, the support hub traverses the entire length of the column conduit and is utilized for center support of the pieces of apparatus of my invention. The upper and lower screens are generally identical in size and should possess sufficiently small openings to be able to prevent solid particles having diameters of roughly 20 to 40 mesh in size from passing through the sorbents although smaller or larger diameter particles and screens may be utilized. Typically the screens contain gratings which may support them since screens themselves do not possess sufficient resilience to support particles which are placed on them. In many instances it is desired to support screens themselves with solid metal discs which have machined openings smaller than the diameter of the material placed above them.

The ribs are typically metal bar stock, are rested on the support hub, extend radially from the support hub and are connected to the inner wall of the column. Typically the ribs are of sufficient thickness to allow the solids retaining screens to be spaced apart from a few inches to many feet (preferably 3 to 5 inches), and are connected to the support screens so that the volume between the individual ribs is essentially segregated from the segment volume located between other such ribs.

The fluid transfer means is typically a distribution box which is placed between the screens and preferably directly connected to them and located adjacent to, or partially within, the passage of the fluid deflection plate. The fluid transfer means is typically connected to a fluid transfer conduit which can enter the column from a remote location and pass through at least one of the solids retaining screens and be directly connected with the fluid transfer means. The fluid transfer means preferably has exits which face the edges of the fluid deflection plate. There is preferably one fluid transfer means located between each set of ribs. The fluid transfer means and ribs are placed along a plane perpendicular to the axis of the support hub and the column so that essentially the entire cross-sectional area of the solid particles located within the column is traversed by many compartments which can make up the apparatus of my invention.

The fluid deflection plate is typically made of metal and is required to be located between solids retaining screens. The fluid deflection plate contains a passageway which is located at a distance between the support hub and the inner wall of the column conduit so that there is an equal amount of adsorbent in the annular volume between the hub and the column wall located between the passage and the hub and the passage and the column wall. This allows substantially plug flow to occur since the fluid transfer means which is preferably located within the passage-way is near the center of the annular volume formed between the support hub and the inside of the column wall.

The passage located in the fluid distribution plate is typically a rectangular hole which is cut out of the plate with a sufficient size to allow reasonable pressure drop to occur through this passage-way when fluid is passed through the passage. In some instances, and as illustrated in the drawings, the passage may be a slot cut out of the fluid deflection plate which may traverse the plate totally between the two ribs which are connected to the fluid distribution plate. In these instances the fluid deflection plate is divided into two separate plates—namely, an inner deflection plate and an outer deflection plate. Preferably in these instances the inner and outer deflection plates are tapered so that the narrowest thickness of the fluid deflection plate is located close to the passage increasing in thickness as one proceeds from the passage-way to the support hub and the inside wall of the elongated column conduit.

It is preferred to utilize one or more of the apparatus of my invention in a fluid solid contacting device. Preferably four or more of these apparatus can be distributed along the axis of the elongated column which contains the solid particles to separate the solid particles into many beds. The beds are generally defined as the adsorbent or solid particle material located between the various baffling and flow distribution apparatus of my invention. Typically in the simulated moving bed fluid-solid contacting apparatus, at least four of my apparatus distribution devices will be located within a relatively elongated column of adsorbent. In constructing the apparatus of my invention it is preferable to have many segment volumes located within the same plane which is preferably perpendicular to the axis of the column containing solid particles. Preferably in order to construct my apparatus it is desired to first rest a plurality of ribs on a central hub. In many instances twelve or more ribs may eminate from a central hub and be connected to the inner wall of the column conduit or to a preconstructed outer surface which itself may be welded to or placed upon the inner wall of the elongated column. After this has taken place, the bottoms retaining screen may be welded to the ribs in a permanent configuration. The fluid deflection plate may then be located above the bottoms solids retaining screen with the fluid transfer means and fluid transfer conduit also placed within the device. After all of the above has been completed, the top solids retaining screens may be placed upon the ribs and welded to them to thereby complete the construction of the apparatus of my invention. In this instance when the entire flow distribution apparatus is constructed, it will resemble a circular disc with ribs eminating from the center portion of the disc with the upper and lower solids retaining screens being substantially parallel and themselves being disc-shaped.

The term passage as used in the attached claims and in this specification shall generally refer to a hole or void space located within the fluid deflection plate. Preferably the passage is located between the central hub and the column wall. It may be a circular void space or an elongated oval void space or it may be a segment of the circular segment of the fluids deflection plate which traverses the entire plate from one rib to another separating the fluid deflection plate into inner and outer plates. The area defined as the passage includes the portion of the deflection plate removed to form the passage and volume above and below the passage between the upper and lower solids retaining screens. Using this term as a definition of the passage it can be seen that the passage can entirely traverse the segment volume of this apparatus.

Substantially parallel as used in the specification and attached claims generally refers to the overall spacing of two components of my apparatus in a manner so that they are essentially parallel in construction. The solids retaining screens are considered to be substantially parallel and may vary when proceeding along the two solids retaining screens by virtue of the distortion or flexing of the individual screens from construction or from load carrying capacity. The overall placement of these two screens, however, is parallel. Some major deflections may occur in the upper solids retaining screens because of the load bearing capacity of it and a noticeable bending or flexing of this screen may occur. This will not preclude my reference to these two screens as being placed in a substantially parallel configuration.

Substantially perpendicular, when utilized in this specification and the claims, shall refer to an approximate normal positioning of various components of my apparatus. It is not desired to use the term substantially perpendicular to exclude angles which are above or below 90°. In some instances slight variations may occur in various components of my apparatus in construction or by virtue of their carrying adsorbent particles which may cause a deflection in the components. This may cause the various components or projections thereof to lie in planes which are not exactly parallel to a given axis. Slight changes, as many as five or more or as few as a few tenths of a degree, generally shall include the term substantially perpendicular.

The following is presented as an illustrative example of a preferred configuration of the apparatus of my invention. An apparatus was designed to be used in an elongated column having an inside diameter of approximately 22 feet. Axially aligned with the 22 foot diameter column was a support hub which had an outside diameter of approximately 2 feet. This left a substantial annular volume between the outside of the support hub and the inside of the elongated column. The outside of the support hub and the inside of the column wall were approximately 10 feet apart. An upper and lower solids retaining screen was utilized in my apparatus. The upper and lower solids retaining screens were spaced approximately 2-½ inches apart and were constructed to remain substantially parallel having this essential dimension constant along the upper and lower screens.

The overall apparatus was constructed of 48 ribs which were connected to the central hub and radiated out to the inner portion of the column wall. The 48 ribs made up 24 different segment volumes which were all placed to form an essentially circular disc about the axis of the support hub and substantially perpendicular to it. Located between each of the sets of ribs making up each segment volume was one fluid transfer means which was located within the passage within the fluid deflection plate and which was connected to a fluid transfer conduit which passed out of the upper solids retaining screen into the bed located above this screen and out of the column. The fluid transfer means were placed equally spaced along a circle having an 8 foot radius with its axis aligned with the longitudinal axis of the support hub.

For each segment volume a fluid deflection plate is located between the solids retaining screens. The fluid deflection plate in this preferred illustration was essentially separated into an inner fluid deflection plate and an outer deflection plate substantially identical to the configuration shown in the attached drawings. The inner fluid deflection plate was welded to the adjacent ribs and had four sections which decreased in the thickness as the plate was extended from the support hub to its end (the passage). The section of the inner deflection plate closest to the support hub was approximately 1 inch thick and approximately 2 feet 5 inches in length. The second section connected to the above mentioned first section was approximately ¾ inch thick and extended from the first section about 1 foot 6 inches. The third section was about ½ inch thick and extended from the second section approximately 1 foot 6 inches. The fourth section was approximately ¼ inch thick and extended from the third section approximately 1 foot 4 inches ending in the volume defined as the passage.

The outer deflection plate had its thickest portion connected to the inner wall of the column with that section being approximately 1 inch thick and extended inward approximately 11 inches. Connected to this 1 inch section was a second section which was approximately ¾ inch thick and extended inward 12 inches. The third section of the outer fluid deflection plate was approximately ¼ inch thick and extended approximately 10 inches inward from the second section of the outer fluid deflection plate.

The passage was essentially an arc about 5 inches in width cut out of the fluid deflection plate and had its center of the arc about 8 feet from the axis of the support hub.

The fluid transfer means was located within the volume defined as the passage and had outlets which faced the edges of the inner and outer fluid deflection plates.

I claim as my invention:

1. A baffling and flow distribution apparatus located between two beds of solid particles having a common axis and an outer edge radially located from said axis comprising:
    a. two substantially parallel solids retaining screens spaced apart;
    b. ribs located between said screens and attached to a central support hub and radiating from said central support hub, said hub axially aligned with said axis of said beds, with said ribs extending to the outer edges of said beds to form a plurality of segment volumes between said screens and ribs;
    c. each segment volume containing fluid deflection plate means located between said screens, radiating from said support hub to the outer edge of said beds, said plate means connected to said ribs to separate said segment volume into two compartments;
    d. said deflection plate means having a passage connecting said compartments within said segment volume and located between said support hub and the outer edge of said beds along said plate means;
    e. a fluid transfer means located adjacent to said passage and connected to a fluid transfer conduit to effect the passage of fluid between said conduit and said passage within said segment volume; and
    f. said deflection plate means having decreasing overall thickness when proceeding along said plate means from said support hub to said passage and from the outer edge of said beds to said passage.

2. Claim 1 in that a portion of said fluid transfer means is located within the passage in said plate means.

3. A baffling and flow distribution apparatus located between two solid particle beds, said beds confined within an elongated column, said column and beds having a common longitudinal axis, comprising:
    a. two substantially parallel solids retaining screens spaced apart and positioned substantially perpendicular to said axis;
    b. a central hub axially aligned with said axis;
    c. ribs, located between said screens and connected thereto, connected to said hub and radiating from said hub outwardly extending to said column to form a plurality of segment volumes between said screens;
    d. fluid deflection plate means located between said solids retaining screens and positioned substantially perpendicular to said axis, said plate means attached to said hub and projecting outwardly from said hub and attached to said column, said plate means attached to said ribs thereby separating each segment volume into two compartments;
    e. passage means located in said plate means connecting said compartments and having placed adjacent to said passage means fluid transfer means to effect the passage of fluid between said passage means and said transfer means; and,
    f. said deflection plate means having a decreasing overall thickness when proceeding along said plate means from said support hub to said passage means and from said column to said passage means.

4. Claim 3 in that said passage located in said deflection plate means is positioned between said support hub and said column.

5. Claim 4 in that the ratio of the distance of said passage means from said hub to the distance of said passage means from said column is within the range of from about 2.9 to about 1.3.

* * * * *